July 4, 1972   O. S. GRAY   3,674,422
MICROWAVE TREATING APPARATUS
Filed May 12, 1970   4 Sheets-Sheet 1
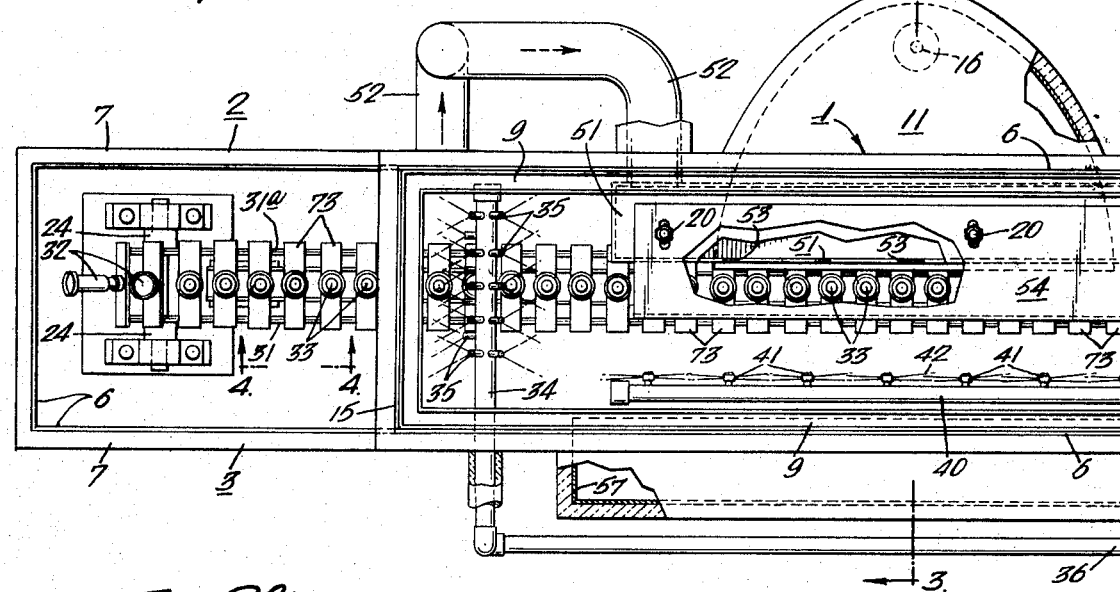
INVENTOR:
OSCAR S. GRAY
BY Howson & Howson
ATTYS.

July 4, 1972 O. S. GRAY 3,674,422
MICROWAVE TREATING APPARATUS
Filed May 12, 1970 4 Sheets-Sheet 2

INVENTOR:
OSCAR S. GRAY
BY Howson & Howson
ATTYS.

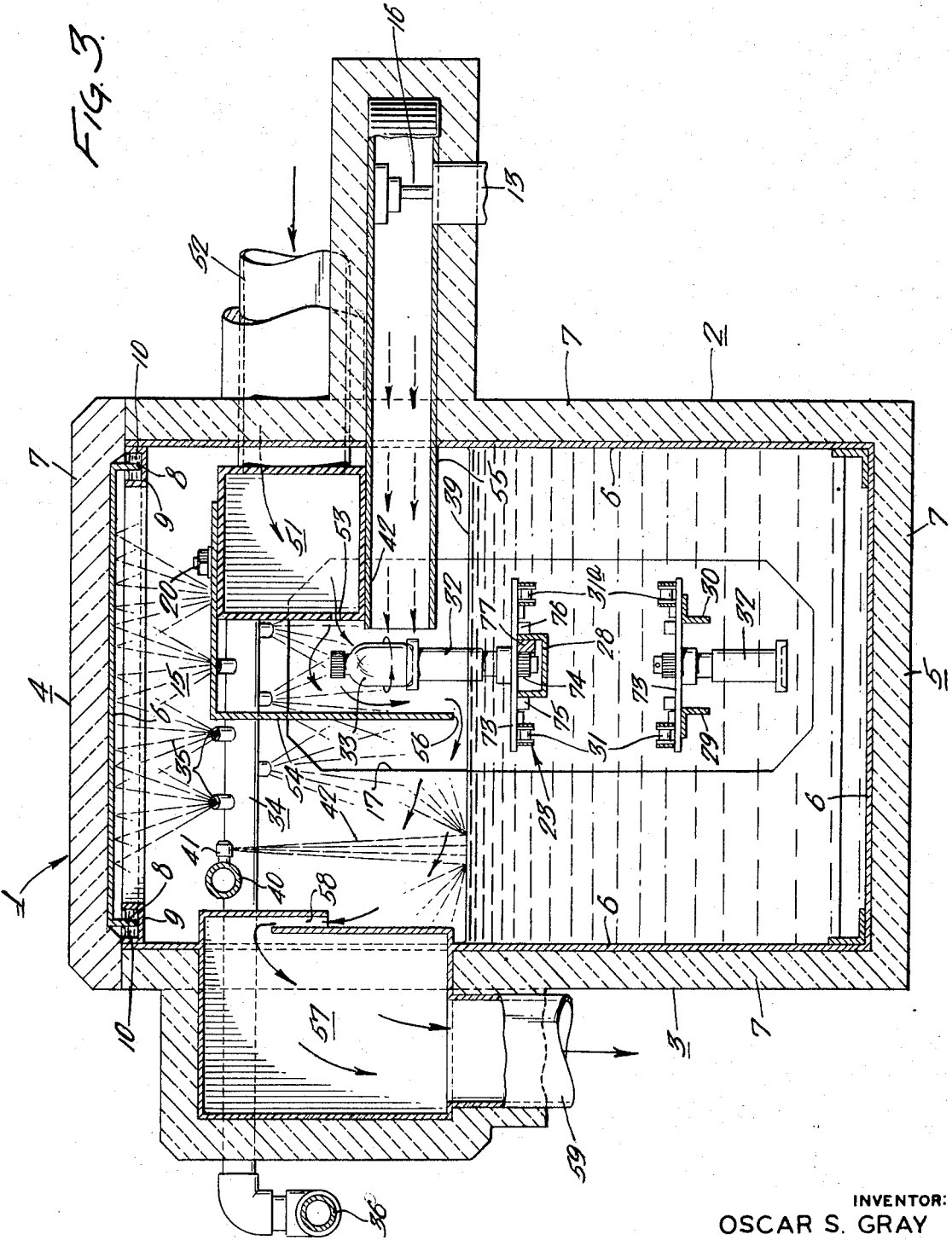

July 4, 1972  O. S. GRAY  3,674,422
MICROWAVE TREATING APPARATUS
Filed May 12, 1970  4 Sheets-Sheet 4
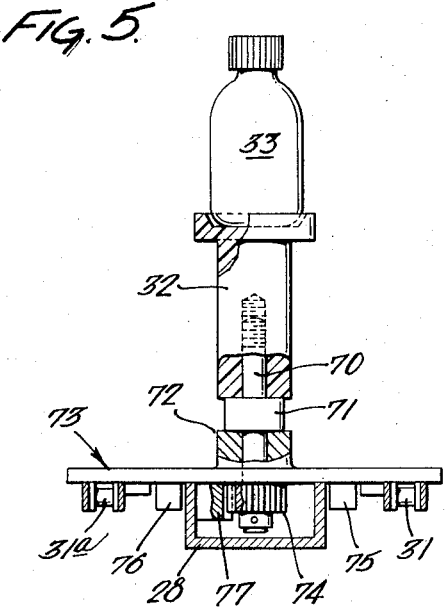
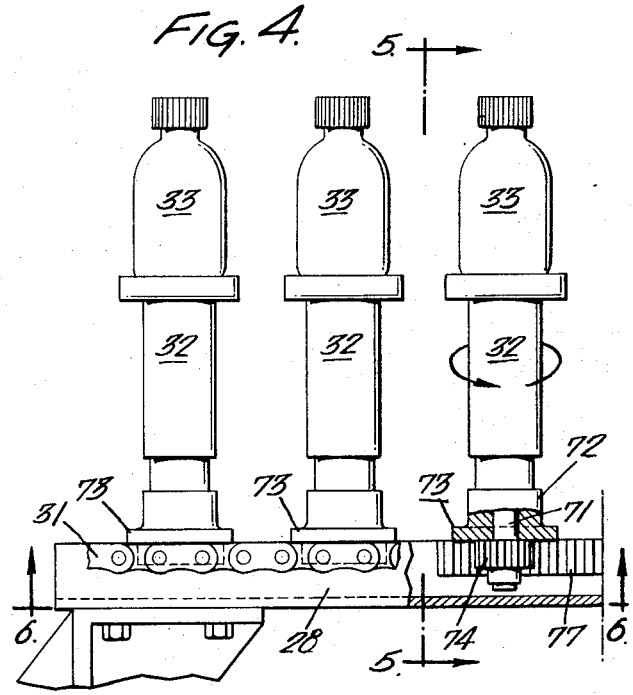
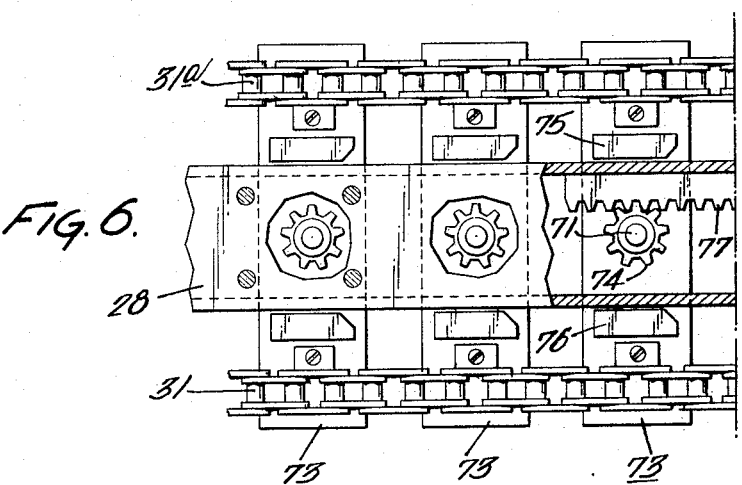
INVENTOR:
OSCAR S. GRAY
BY Howson & Howson
ATTYS.

3,674,422
MICROWAVE TREATING APPARATUS
Oscar S. Gray, Fort Lauderdale, Fla., assignor to Gray
Industries, Inc., Fort Lauderdale, Fla.
Filed May 12, 1970, Ser. No. 36,591
Int. Cl. A61l 3/00; H05b 9/06; A23c 3/06
U.S. Cl. 21—102 R                                28 Claims

ABSTRACT OF THE DISCLOSURE

Apparatus for treating continuously-moving supported articles with microwaves involving an elongated chamber or tunnel having an opening in at least one end thereof adapted to permit the passage therethrough of said moving articles and their supports and means adjacent said opening for providing a mass of droplets of lossy liquid, like water, effective to permit the passage therethrough of said moving articles and their supports while essentially preventing the passage therethrough of microwaves from inside said chamber. Means for supporting and moving the articles through the chamber comprising individual turntables in series in the direction of travel of an endless conveyor system with means for individually rotating each turntable for a predetermined distance are also provided.

BACKGROUND OF THE INVENTION

The treatment of articles with microwave energy is known. In particular it is known that microorganisms (bacteria, viruses and fungi) and enzymes on or in materials containing them can be controlled (e.g. pasteurization, partial sterilization or sterilization in the case of microorganisms and diactivation or stabilization in the case of enzymes) by exposing the material to microwave energy. Thus, my U.S. Pat. No. 3,494,722 is directed to a method and apparatus for sterilizing articles, like medical hardware and supplies, involving the conjoint use of microwaves and steam; my U.S. Pat. No. 3,494,723 is directed to a method and apparatus for controlling microorganisms and enzymes involving the conjoint use of microwaves and a coolant gas; my U.S. Pat. No. 3,494,724 is directed to a method and apparatus for controlling microorganisms and enzymes invloving the conjoint use of microwave energy, infrared radiation and steam; and my copending application Ser. No. 187,181, filed Apr. 17, 1969, is directed to the stabilization of enzymes by subjecting containers of pre-cooled enzyme-containing material to microwaves and a coolant gas. In addition, my U.S. Pat. No. 3,439,510 is directed to the treatment of red blood cells to improve the morphology thereof by controlled treatment with microwaves and a coolant gas.

Apparatus is shown in the foregoing patents for continuous treatment of moving articles including doors and water legs for admitting the articles to be treated to the treatment chamber and for removing them therefrom without permitting microwaves to leak and escape outside the treatment chamber. Such means, however, could stand improvement and simplification.

U.S. Pat. No. 3,365,562 relates to an apparatus for continuously treating moving products with microwaves involving a treating chamber having entrances and exit openings and, added to and connected with these openings, microwave attenuating tunnels. These tunnels have walls adapted to retain water, e.g. hollow channels the inner walls of which are of microwave-permeable material and it is stated that microwaves passing out of the enrance and exit openings of the treating chamber are reflected into the water-containing walls thereby becoming attenuated. These tunnels add materially to the size of the equipment. For example, it is stated that with a treating chamber eight feet long two tunnels each two feet long are used. Moreover such apparatus is not adapted for treating containers of products immediately before and/or after treatment with the microwaves.

It is the principal object of the present invention, therefore, to provide improved apparatus for the continuous treatment of articles with microwaves.

It is another object of the present invention to provide improved apparatus of the type referred to wherein the articles may be simply and easily admitted to or removed from the treating chamber or both without escape of microwaves from the treatment chamber.

Still another object of the present invention is to provide apparatus of the type described wherein the articles treated may be cooled immediately before and/or after treatment with the microwaves.

A further object of the present invention is to provide apparatus of the type described embodying improvements within the microwave treating chamber adapted to minimize escape of microwaves from the microwave treating chamber.

Other objects including novel means for supporting and carrying articles to be treated with microwaves into, through and out of the treatment chamber, will become apparent from a consideration of the following specification and claims.

SUMMARY OF THE INVENTION

The apparatus of the present invention comprises, in apparatus for the treatment of moving articles with mcirowave energy involving an elongated chamber having bottom, top and side walls, means for supporting and moving articles through said chamber and means for admitting microwave energy into said chamber and directing the same to said articles, the improvement comprising an opening in at least one end of said chamber said opening being adapted to permit the passage therethrough of said moving articles and supporting means, and means adjacent said opening for providing a mass of droplets of lossy liquid effective to permit the passage therethrough of said moving articles and support means while essentially preventing the passing therethrough of microwaves from inside said chamber.

In one embodiment a spray wall of lossy liquid droplets is also provided along the inside of the treating chamber opposite the incoming microwaves, the articles being treated passing between the incoming microwaves and the spray wall of droplets and the latter thus serving as partial back stop for microwaves not being absorbed by the articles. As will also appear, this spray wall of lossy liquid droplets may also be employed to cool a coolant gas employed in the preferred embodiment.

In a further embodiment, the chamber is adapted to retain a body of the lossy liquid therein to a predetermined level to shield from microwaves metal parts in the chamber below the level of the articles being treated and the incoming microwaves.

In still another embodiment, microwave-reflecting means are provided inside the treating chamber opposite the incoming microwaves, the articles being treated passing between the incoming microwaves and the reflecting means whereby microwaves not absorbed by the moving articles are reflected back toward the articles. Advantageously these reflecting means are movably adjustable to accommodate articles of various sizes and shapes.

Means are also included for supporting and moving the articles into, through and out of the treating chamber which means are adapted to rotate to present all sides of the article directly to the incoming microwaves. These support means are part of an endless conveyor system, and, in their top flight into, through and out of the treating chamber, they are arranged to begin rotation at a predetermined point before treatment with the microwaves and to stop rotation at a second predetermined point after treatment.

In the preferred embodiment of the apparatus of the present invention, as stated, there are also included means to admit a coolant gas into the treating chamber for contact with the articles while they are being subjected to microwaves.

BRIEF DESCRIPTION OF THE DRAWINGS

FIG. 1a is a plan view, partly in section, illustrating the entrance half of a preferred apparatus of the present invention;

FIG. 1b is a plan view, partly in section, illustrating the exit half of the preferred apparatus partially shown in FIG. 1a;

FIG. 2a is a side elevational view, partly in section, of the portion of the preferred apparatus shown in FIG. 1a;

FIG. 3 is an enlarged transverse sectional view taken along the line 3—3 in FIG. 1a;

FIG. 4 is an enlarged side elevational view, partly in section, showing in greater detail preferred means for supporting articles to be treated;

FIG. 5 is an end elevational view, partly in section, taken along the line 5—5 in FIG. 4; and FIG. 6 is a bottom plan view, partly in section, taken along the line 6—6 of FIG. 4.

As is well known, microwave energy is the electromagnetic wave energy of a wave length falling in the microwave region of the electromagnetic spectrum. The Federal Communications Commission has presently set aside, for microwave processing, bands of microwave energy within the range of between about 400 and about 20,000 megacycles per second with a wave length ranging from about 13 inches for the lower frequencies to about .7 inch for the highest frequencies; specifically: frequencies of about 890–940 with a wave length of about 13 inches, frequencies of about 2300–2500 with a wave length of about 4–5 inches, and frequencies of 17,850–18,000 with a wave length of about 0.7 inch. The presently preferred microwave energy for use according to the present invention is an intermediate range having a frequency from about 1000 to about 5000, more particularly from about 2000 to about 3,000 megacycles per second. Microwave energy is generated from a suitable high frequency source, such as a magnetron. The generation and use of microwave energy by itself is well known since such has been used for many years in the cooking of food.

DESCRIPTION OF PREFERRED EMBODIMENTS

Figure 1B:
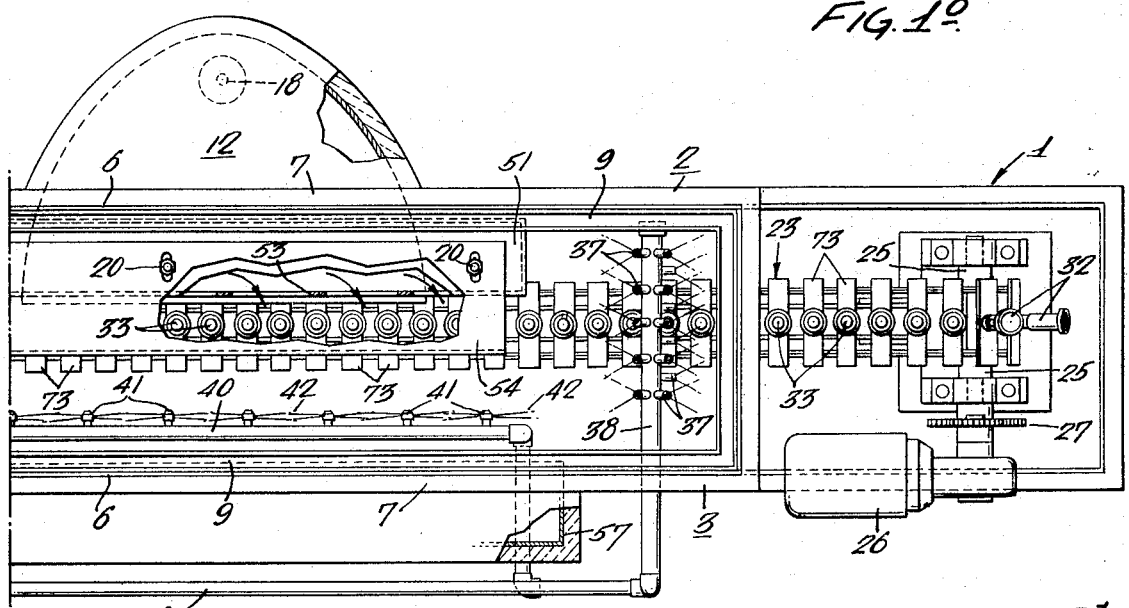
Figure 2B:
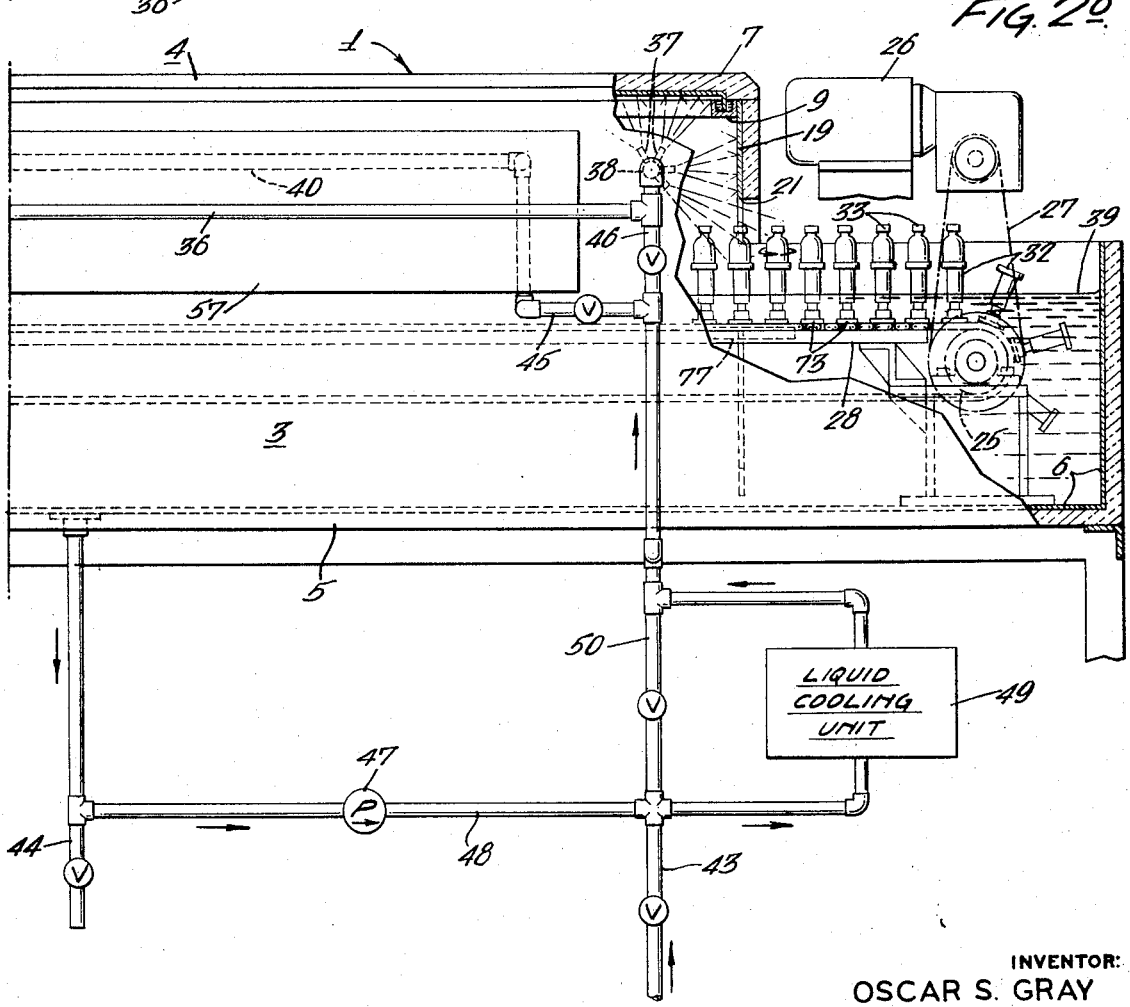
FIG. 2b is a side elevational view, partly in section, of the portion of the preferred apparatus shown in FIG. 1b.

Referring then to FIGS. 1a, 1b, 2a, 2b and 3, numeral 1 represents generally a horizontally elongated chamber (sometimes referred to as a tunnel) comprising side walls 2 and 3, respectively; top wall 4 and bottom wall 5. The chamber may be constructed of an inner conductive layer 6, of metal, such as steel, including stainless steel, with an outer coating, 7, of thermal insulating or protective material, such as synthetic plastic or resin foam. Top wall 4 may be removable, as by simple lifting, with means to prevent leakage of microwaves at the joints illustrated as continuous flanges, 8, extending down into continuous fluid channels, 9, containing a lossy liquid, 10, like water.

Means are provided for admitting microwave energy into chamber 1, and these are illustrated by parabolic wave guides, 11 and 12, containing radiators 16 and 18, respectively, coupled to sources of microwave energy, such as magnetrons (not shown), through appropriate connectors shown schematically as 13 and 14, respectively. The general direction of travel of the microwaves is illustrated by the arrows pointing to the left in wave guide 11 in FIG. 3.

As illustrated in FIGS. 1a, 2a, and 3, the entrance portion of treating chamber 1 is bounded by top wall 4, side walls 2 and 3 and end wall 15 provided with opening, 17. Likewise, the exit portion of chamber 1 may also be similar to that described in connection with the entrance portion, comprising top wall 4, side walls 2 and 3 and end wall 19 provided with opening 21.

Means are provided for supporting and moving containers into, through and out of chamber 1, illustrated, in this instance, as endless conveyor arrangement 23 including sprocket chains 31 and 31a movable about paired sprocket wheels 24, 24 and 25, 25 the latter pair of which is shown as being driven as by a variable speed motor 26 through a drive train generally designated as 27. As shown in FIGS. 3–6 the top flight of endless conveyor 23 may be supported as on channel 28 and, as shown in FIG. 3, the bottom flight of endless conveyor 23 may be supported as on rails 29 and 30. As illustrated in the drawings, the means for supporting containers for treatment in chamber 1 may be in the form of individual rotatable pedestals or turntables 32 each shown as being adapted to suport a glass or plastic (microwave-permeable) bottle or other container 33. In FIGS. 1a, 1b, 2a, and 2b, the movement of the endless conveyor (top flight), supports the containers into, through and out of chamber 1 is to the right.

Opening 17 in the entrance portion of chamber 1 and opening 21 of the exit portion of chamber 1 are of a size to permit free passage therethrough of the endless conveyor, supports and containers. In operation of the apparatus, the endless conveyor assembly is started, containers are loaded onto the supports and the generation of microwaves is commenced. In passing through chamber 1, containers 33 pass before the mouths of wave guides 11 and 12 where the contents of the containers are subjected to and absorb microwave energy. Some microwaves, however, bypass the containers and, by reflection from the chamber walls, those which are not otherwise absorbed by means described more in detail hereinafter would ordinarily escape through the entrance and exit openings, 17 and 21, respectively. A feature of the present invention is the provision of simple means essentially to prevent this escape of microwave energy. Such means, as illustrated in FIGS. 1a, 1b, 2a and 2b, comprise means adjacent entrance opening 17 and exit opening 21 for providing a mass or zone of rapidly moving droplets of lossy liquid, like water, through which the supports 32 and containers 33 can freely move but through which the passage of microwaves from inside chamber 1 is essentially prevented. Such a zone may be provided at the entrance end, as illustrated, by spray means comprising a conduit, 34, provided with a plurality of spray nozzles, 35. At least some of spray nozzles, 35, are pointed in a generally upward direction so as to direct spray streams toward and against inside of top wall 4 where they splash at high velocity becoming further disrupted and fall as a mass of fine droplets downwardly between the microwaves and opening 17. Some of the spray nozzles may also be pointed toward and against end wall 15 above opening 17 where they splash becoming further disrupted and form part of the falling mass of lossy liquid. And some of the nozzles may be pointed downwardly and toward the opening 17 to add to the density of the droplets. This myriad of closely spaced droplets suspended (rising and falling) in the air space behind opening 17 effectively screens the opening absorbing microwaves which would otherwise leak out of opening 17. However, containers 33 and their supports can readily pass therethrough. If desired, a baffle may be provided inwardly of end wall 15 and between conduit 34 and the near end of wave guide 11, for example a distance downstream (in the direction of travel of the top flight of endless conveyor arrangement 23) from conduit 34 about equal to that between end wall 15 and conduit 34. Such a baffle may be a metal plate suspended from top wall 4 or attached to side walls 2 and 3 and may even have a cross-sectional configuration similar to that of end wall 15 including an opening similar to that of opening 17. Such a baffle serves to enhance the provision of the mass of lossy liquid droplets, since nozzles on conduit 34 may be pointed upwardly and toward the baffle, and also serves to prevent lossy liquid from landing on the containers in the vicinity of the mouths of the wave guides.

Other means for providing a microwave-impermeable shield or barrier of lossy liquid in the air space inside but adjacent entrance opening 17 may be employed in place of the illustrated spray means. For example, a plurality of successive weir means may be located adjacent and above opening 17 whereby lossy liquid is caused to flow over the weirs and downwardly as more or less continuous sheets or curtains. Lossy liquid may be supplied to conduit 34 through conduit 36.

Operation at the exit end of chamber 1 may be the same as that just described, including provision of a baffle inwardly of conduit 38, with lossy liquid being supplied to spray nozzles 37 through conduit 38.

Advantageously as an aid in minimizing loss of microwave energy toward the entrance and exit openings of chamber 1 and to favor balanced load conditions within chamber 1, there is also provided means along the inside of chamber 1 opposite the mouths of waveguides 11 and 12 to provide a mass of freely moving droplets of lossy liquid, like a spray or curtain thereof. Such means are illustrated in FIGS. 1a, 1b, 2a, 2b and 3 as spray means including conduit 40 and a plurality of associated spray nozzles 41 positioned above the top wall of the wave guides 11 and 12 (e.g. top wall 42 as shown in FIG. 3) and adapted to form a spray, 42, of lossy liquid, like water, between the mouths of wave guides 11 and 12 and sidewall 3. As will appear hereinafter an important function of spray 42 is to cool spent coolant gas.

As a further aid in minimizing loss of microwaves and approaching balanced load conditions, it is preferred that a body, 39, of lossy liquid be maintained in chamber 1 to a predetermined level. Such liquid body effectively absorbs extraneous microwave energy before its impingement on and reflection by the submerged portion of inner metal layer 6 and other submerged metal parts such as sprocket chains 31 and 31a. The desired level may be maintained through control of valved conduits discussed hereinafter.

Lossy liquid may be supplied to the various functioning conduits, 34, 38 and 40 through valved common main conduit 43 and removed from the system through common valved conduit 44. Appropriate valved connections 45 and 46 are included to control the rate of flow of lossy liquid to the functioning conduits 34, 38 and 40. To maintain controlled temperature conditions in liquid body 39 as well as in the liquid sprays or curtains, the liquid, or a portion thereof, may be recycled by pump 47 through conduit 48 to a temperature control means, such as cooling unit 49. Means, such as valved conduit 50, may be included so that some or all of the recycled liquid may bypass unit 49.

To improve efficiency of absorption of microwaves by containers 33 and their contents there are preferably provided means for reflecting microwaves which initially bypass containers 33 back to the containers. Such means, are illustrated as metal wall 54 extending along the treating chamber 1 essentially at least a distant coinciding with the area of microwave admission, e.g. the mouths of the wave guides. Reflecting wall 54 is advantageously made movably adjustable so that it can be moved toward or away from the mouth of the wave guides to accommodate articles of different sizes and shapes. Such adjustment may be made by means of slot-bolt arrangement 20.

In accordance with a preferred embodiment of the present apparatus, there are also provided means for contacting containers 33, during treatment with the microwave energy, with a stream of coolant gas, such as chilled air, nitrogen, carbon dioxide, ethylene oxide, argon, or the like, in accordance with the subject matter described and claimed in U.S. Pat. No. 3,494,723. To this end there may be provided means for forcing such a gas into chamber 1 for contact with the containers as they pass before the mouths of the wave guides. Thus, as illustrated particularly in FIGS. 1a, 1b, 2a and 3, there may be provided an elongated plenum chamber 51 into which coolant gas is forced through conduit 52 and out of which it is forced to pass through openings 53 for contact with containers 33 essentially at least during their travel before the mouths of the wave guide. Aiding this contact and in maintaining the coolant gas under some positive pressure during such contact is reflector wall 54 which, in addition to reflecting microwaves initially bypassing containers 33 back to the containers, confines the gas momentarily while in contact with the containers by restricting its escape from the site of the containers to the further reaches of the inside of chamber 1. Thus, as illustrated in FIG. 3, reflector wall 54 provides restricted gas outlet means, such as the space between the bottom wall of the wave guides (e.g. bottom wall 55 of wave guide 11) and the top of liquid body 39 and the space between the bottom edge 56 of reflector wall 54 and the top of liquid body 39. Spent coolant gas may be removed from chamber 1 through exhaust chamber 57, by way of opening 58, and thence through conduit 59. Before passing into exhaust chamber 57, the spent coolant gas passes through spray 42 which cools the gas before recycling through conduits 59 and 52. This may be sufficient cooling. However, to provide additional temperature control of the coolant gas, the gas may be passed through gas temperature control means, such as cooling unit 60, and thence through conduit 52 for re-entry into plenum 51.

Referring to FIGS. 4, 5 and 6, these show more particularly a preferred construction of the container support means. Numeral 32 represents a support removably mounted, as through threading, on pin 70. Pin 70, having a hub portion 71, is rotatably journaled in bearing 72 on base plate 73, and extends through base plate 73 to the underside thereof, the extended end of the pin being attached to a pinion gear 74. Base plates 73 are attached to sprocket chains 31 and 31a. The endless conveyor assembly 23 comprising base plates 73 and sprocket chains 31 and 31a is supported (top flight) by channel 28 and is properly aligned and positioned in its travel by guide shoes 75 and 76. With the endless conveyor in movement (top flight to the right in FIGS. 4 and 6) containers 33 are placed on supports 32 prior to the entrance end of chamber 1. At a predetermined point illustrated just to the left of line 5—5 in FIG. 4 and just outside opening 17 in FIG. 2a, pinion gear 74 engages a rack 77 secured to an inner side wall of channel 28 causing gear 74, pin 70, support 32 and container 33 to rotate about their vertical axis. Rack 77 continues through chamber 1 to a predetermined point, generally at least beyond the far end of the mouth of wave guide 12, and illustrated as continuing beyond the exit end, where it discontinues resulting in cessation of rotation of container 33. Beyond this point the containers may be removed from the supports. Hence the containers rotate at least essentially throughout their passage before the mouths of the wave guides providing uniform absorption of the microwave energy by the contents. Some rotation before and/or after direct contact with the incoming microwaves, as in the zone of droplets of lossy liquid adjacent the entrance and/or exit openings of the chamber, may be advantageous depending upon the desired degree of pre- and/or post cooling of the containers and their contents. Supports 32, as stated, are removably mounted on pin 70 so that they can be interchanged with and replaced by supports having different dimensions thus being adapted to support containers of different sizes and shapes. In addition, by the threaded arrangement shown supports 32 can be raised or lowered to provide optimum positioning of the containers during their travel before the mouths of the wave guides.

Parts of the present apparatus which are positioned inside, or at least travel inside, chamber 1 and which would ordinarily be subjected to microwaves without having any planned reflecting function, will, where feasible, be made of microwave permeable materials, such as polyethylene, polymethylmethacrylate, polyethylene terephthalate, and the like. This applies particularly to supports 32, plenum 51, conduits 34, 38 and 40 and spray nozzles 35, 37 and 41.

The apparatus of the present invention provides the opportunity of exercising precise control during the treatment of any particular material depending upon the nature of the material itself and the results sought to be achieved. Thus, the nature, amount and power of the microwave energy may be varied, as is known; the temperature of the lossy liquid used in the various sprays or curtains and in the liquid body itself may be varied controllably. Furthermore, the speed of travel of the endless conveyor, and hence of the containers, through the treating chamber may be varied; and the size of the containers and number of containers passed per unit time can be varied (a container need not be placed on each support) thereby affording additional control of the amount of microwave energy imparted to the contents of each container.

The foregoing has been described in terms of using microwave energy as the sole electromagnetic energy. It will be understood that the present apparatus is adaptable to the conjoint use of microwave energy and infra red radiation by the insertion of infra red radiating means in chamber 1 for radiation of infra red rays to the containers.

It will also be appreciated that, although the invention has been described in terms of an entrance opening and an exit opening each of which is provided adjacent thereto with the described lossy liquid spray or curtain, advantages of the present invention may be realized when such arrangement is provided only at either the entrance or the exit, but not both, in conjunction with another entrance or exit expedient, as the case may be.

The walls of the containers may be conventional substantially gas-impermeable packaging materials like glass, methylmethacrylate, polystyrene and polyethylene, as in bottles, jars, flasks and tubes; sheets, especially thermoplastic, heat-sealable films like polyvinylidene chloride, polyethylene terephthalate, copolymers of vinylidine chloride and vinyl chloride, polyethylene, cellophane, plastic-coated paper and cardboard, and the like. Part of the container may be of material impermeable to microwave energy, like aluminum foil and steel (as in a "tin" can) so long as the wall of the container facing the source of microwave energy is permeable thereto. For example, the container for the material being treated may be an aluminum foil tray with a film of microwave permeable film as a cover. Or, as in the case of sterilization in conjunction with canning, the container may be a can the open top of which is covered with, say, a polymethylmethacrylate or glass plate through which the microwaves may travel. The container will be substantially gas tight. The containers may be in any form, such as bottles, jars, flasks, cans, trays, pouches, envelopes, boxes and the like.

The present apparatus is applicable to the treatment of any material with microwaves for any purpose. This may include pasteurization, partial sterilization or sterilization in the case of microorganism, or enzyme deactivation, or the stabilization of materials, like enzymes. This includes treatment of foodstuffs which are perishable, that is, which are subject to deleterious change by the action of microorganisms (bacteria and/or fungi) or enzymes and which contain moisture. The food may range in consistency from thin liquids to solids. Examples of such foodstuffs are milk (whole milk, homogenized whole milk, skimmed milk, concentrated milk and the like milk products); fruit and vegetable juices (including juice concentrates); beer, wine and other manufactured beverages, like "soft" drinks, soups; grains, like raw or cooked corn, and cooked rice; vegetables; fruit; stews; soups; meat, including fish and poultry; eggs; pastries; bread; sandwiches; and the like. The food as treated may be raw, cooked (including baked) or partially cooked. Also applicable are materials which although they are organic materials of natural origin like the foodstuffs mentioned above, are not normally considered edible, such as blood (whole, plasma or serum or other blood fractions), tobacco, and the like, but which nevertheless are subject to deterioration by the action of microorganisms or enzymes or contain materials like enzymes which it is desired to stabilize. Also included are materials like pharmaceuticals which, whether essentially organic or inorganic, are subject to such deterioration or may serve as carriers of undesirable micrroorganism. With such materials, both edible and inedible, the principal result of treatment is preservation in packaged form. Also included are materials which, although deterioation thereof is not a principal problem nevertheless act as carriers for microorganisms which can contaminate other materials or living bodies and which are, therefore, desirably sterilized. Most notable in this group are materials used in the practice of medicine, like instruments; textiles, such as surgical wearing apparel, towels and bed linen; surgical gloves and the like. It will be apparent from the foregoing that the object of the treatment may be the sterilization of the inside of an "empty" sealed container. Here, of course, the material being treated is the air or other gas within the container and the interior surfaces themselves.

I claim:
1. In apparatus for the treatment of moving articles with microwave energy involving an elongated chamber having bottom, top and side walls, means for supporting and moving articles through said chamber and means for admitting microwave energy to said chamber and directing the same to said articles, the improvement comprising an opening at at least one end of said chamber said opening being adapted to permit the passage therethrough of said moving articles and supporting means, and means adjacent said opening for providing a mass of droplets of lossy liquid effective to permit the passage therethrough of said moving articles and support means while essentially preventing the passage therethrough of microwaves from inside said chamber.

2. The apparatus of claim 1 wherein said means for providing the mass of lossy liquid droplets comprises conduit means disposed crosswise in said chamber adjacent said opening, said conduit means having a plurality of openings therealong adapted to deliver individual sprays of lossy liquid.

3. The apparatus of claim 2 wherein said openings in said conduit include nozzles disposed in a generally upward direction for directing said sprays toward the top of said chamber adjacent said opening.

4. The apparatus of claim 1 comprising also means for admitting a coolant gas to said chamber for contact with said articles at a site in said chamber where said articles are also being subjected to microwave energy.

5. The apparatus of claim 4 comprising means for cooling said gas.

6. The apparatus of claim 1 comprising also means for maintaining a body of lossy liquid in said chamber.

7. The apparatus of claim 6 wherein said means for maintaining said body of lossy liquid is adapted to maintain the top of said body of lossy liquid adjacent but below said means for admitting microwaves to said chamber.

8. The apparatus of claim 1 comprising also microwave-reflecting means spaced from the microwave-admitting means whereby said support means pass between said microwave-reflecting means and said microwave-admitting means.

9. The apparatus of claim 8 wherein said microwave-reflecting means are movably adjustable toward and away from said microwave admitting means.

10. The apparatus of claim 1 wherein said means for supporting and moving said articles comprise individual turntables in series in the direction of travel along an endless conveyor, and comprising means for individually rotating each turntable for a predetermined distance of its travel through said chamber.

11. The apparatus of claim 10 wherein said turntable-rotating means are also adapted to rotate said turntables while said turntables are passing through said mass of lossy liquid droplets.

12. The apparatus of claim 10 wherein said turntables are removably mounted on said endless conveyor.

13. The apparatus of claim 10 wherein said turntables are movably adjustable in a vertical direction.

14. In apparatus for the treatment of moving articles with microwave energy involving an elongated chamber having bottom, top and side walls, means for supporting and moving articles to be treated with microwave energy through said chamber and means for admitting microwave energy to said chamber and directing the same to said articles, the improvement comprising an entrance opening at one end of said chamber and an exit opening at the other end, said openings being adapted to permit the passage therethrough of said moving supports and associated articles and means adjacent each of said openings for providing a mass of droplets of lossy liquid effective to permit the passage therethrough of said moving supports and associated articles while essentially preventing the passage therethrough of microwaves from inside said chamber.

15. The apparatus of claim 14 wherein said means for providing the mass of lossy liquid droplets comprises conduit means disposed across said chamber adjacent said openings, said conduit means having a plurality of openings therealong adapted to deliver individual sprays of lossy liquid.

16. The apparatus of claim 15 wherein said openings in said conduit means include nozzles disposed in a generally upward direction for directing said sprays toward the top of said chamber adjacent said entrance and exit openings.

17. The apparatus of claim 14 comprising also means for admitting a coolant gas to said chamber for contact with said articles at a site in said chamber where said articles are also being subjected to microwave energy.

18. The apparatus of claim 17 comprising means for cooling said gas.

19. The apparatus of claim 14 comprising also means for maintaining a body of lossy liquid in said chamber.

20. The apparatus of claim 19 wherein said means for maintaining said body of lossy liquid is adapted to maintain the top of said body of lossy liquid adjacent but below said means for admitting microwaves to said chamber.

21. The apparatus of claim 14 comprising also microwave-reflecting means spaced from the microwave-admitting means whereby said support means pass between said microwave-reflecting means and said microwave-admitting means.

22. The apparatus of claim 21 wherein said microwave-reflecting means are movably adjustable toward and away from said microwave-admitting means.

23. The apparatus of claim 14 wherein said means for supporting and moving said articles comprise individual turntables in series in the direction of travel along an endless conveyor, and comprising means for individually rotating each turntable for a predetermined distance of its travel through said chamber.

24. The apparatus of claim 23 wherein said turntable-rotating means are also adapted to rotate said turntables while said turntables are passing through at least one of said masses of lossy liquid droplets.

25. The apparatus of claim 23 wherein said turntables are removably mounted on said endless conveyor.

26. The apparatus of claim 23 wherein said turntables are movably adjustable in a vertical direction.

27. In apparatus for the treatment of moving articles with microwave energy involving an elongated chamber having bottom, top and side walls, means for supporting and moving articles to be treated with microwave energy through said chamber, means for admitting microwave energy to said chamber and directing the same to said articles, and entrance and exit means in said chamber adapted to permit the passage of said support means and articles thereon into and out of said chamber without permitting microwaves inside said chamber to leak therethrough, the improvement wherein said means for supporting and moving said articles comprise individual turntables in series in the direction of travel along an endless conveyor and movably adjustable in a vertical position with means for individually rotating each turntable for a predetermined distance in its travel through said chamber.

28. In apparatus for the treatment of moving articles with microwave energy involving an elongated chamber having bottom, top and side walls, means for supporting and moving articles to be treated with microwave energy through said chamber, means for admitting microwave energy to said chamber and directing the same to said articles, and entrance and exit means in said chamber adapted to permit the passage of said support means and articles thereon into and out of said chamber without permitting microwaves inside said chamber to leak therethrough, the improvement wherein said means for supporting and moving said articles comprise individual turntables in series in the direction of travel along an endless conveyor with means for individually rotating each turntable for a predetermined distance in its travel through said chamber and comprising microwave-reflecting means spaced from the microwave-admitting means whereby the path of said turntables passes between said microwave-reflecting means and said microwave-admitting means said microwave-reflecting means further being movably adjustable toward and away from said microwave-admitting means.

References Cited

UNITED STATES PATENTS

| Number | Date | Name | Class |
|---|---|---|---|
| 3,263,052 | 7/1966 | Jeppson et al. | 219—10.55 |
| 2,058,826 | 10/1936 | Reece | 21—101 UX |
| 2,087,751 | 7/1937 | Buttolph | 21—80 X |
| 3,239,643 | 3/1966 | Kluck | 219—10.55 |
| 3,365,562 | 1/1968 | Jeppson | 219—10.55 |
| 3,398,251 | 8/1968 | Jeppson et al. | 99—217 X |

JOSEPH SCOVRONEK, Primary Examiner

D. G. MILLMAN, Assistant Examiner

U.S. Cl. X.R.

21—80; 99—249, 252; 219—10.55